US012623730B2

(12) United States Patent
Pakkam et al.

(10) Patent No.: US 12,623,730 B2
(45) Date of Patent: May 12, 2026

(54) VEHICLE AERODYNAMIC ALTERING SYSTEM AND METHOD

(71) Applicant: Ford Global Technologies, LLC, Dearborn, MI (US)

(72) Inventors: Sriram Pakkam, Royal Oak, MI (US); Michael John Harmon, Northville, MI (US); Andrew Brand, Bloomfield Township, MI (US); Marius Curea, Canton, MI (US); Jack Marchlewski, Smithville, MO (US)

(73) Assignee: Ford Global Technologies, LLC, Dearborn, MI (US)

( * ) Notice: Subject to any disclaimer, the term of this patent is extended or adjusted under 35 U.S.C. 154(b) by 401 days.

(21) Appl. No.: 18/329,844

(22) Filed: Jun. 6, 2023

(65) Prior Publication Data

US 2024/0034419 A1      Feb. 1, 2024

Related U.S. Application Data

(60) Provisional application No. 63/392,544, filed on Jul. 27, 2022.

(51) Int. Cl.
| | |
|---|---|
| *B62D 35/00* | (2006.01) |
| *B60J 7/06* | (2006.01) |
| *B60J 7/08* | (2006.01) |
| *B60J 7/14* | (2006.01) |

(52) U.S. Cl.
CPC .............. *B62D 35/00* (2013.01); *B60J 7/068* (2013.01); *B60J 7/085* (2013.01); *B60J 7/141* (2013.01)

(58) Field of Classification Search
CPC ... B60J 7/141; B60J 7/068; B60J 7/041; B60J 7/08; B62D 35/00; B62D 37/02; B62D 35/007; B62D 33/04; B62D 33/08
USPC .............. 296/100.11, 100.12, 100.1, 100.08, 296/100.06, 181.5, 136.03, 136.05, 180.1, 296/180.5, 171, 175
See application file for complete search history.

(56) References Cited

U.S. PATENT DOCUMENTS

| | | | | |
|---|---|---|---|---|
| 4,475,759 | A | 10/1984 | Wine | |
| 4,659,136 | A * | 4/1987 | Martin ..................... | B60J 7/041 296/26.05 |
| 4,815,786 | A * | 3/1989 | McRay ..................... | B60P 3/34 296/26.05 |
| 5,368,396 | A * | 11/1994 | Cantrell ................... | B60J 7/041 16/98 |
| 6,851,741 | B1 * | 2/2005 | Burg ........................ | B60N 2/36 296/57.1 |
| 6,896,313 | B2 | 5/2005 | Mack et al. | |
| 8,540,302 | B2 * | 9/2013 | Lenz, Jr. .................. | B60J 7/026 296/100.03 |
| 9,944,216 | B2 | 4/2018 | Hannan et al. | |

(Continued)

FOREIGN PATENT DOCUMENTS

CA          2521840 A1      4/2007

*Primary Examiner* — Amy R Weisberg
*Assistant Examiner* — Denise Lynne Esquivel
(74) *Attorney, Agent, or Firm* — Vichit Chea; Carlson, Gaskey & Olds, P.C.

(57)          ABSTRACT
A vehicle system includes a plurality of fins engaged with a bed wall of a cargo bed. The plurality of fins are configured to move telescopically back-and-forth between a stowed position and a deployed position. The fins can be disposed along a vertical top of the bed wall. The fins can slidably engage the bed wall.

19 Claims, 8 Drawing Sheets

(56)                    References Cited

U.S. PATENT DOCUMENTS

2015/0266363 A1*  9/2015  Yamaguchi ............ B62D 37/02
                                                   296/180.1
2021/0170847 A1*  6/2021  Singer ...................... B60P 3/42
2022/0009566 A1*  1/2022  Breidenbach .......... B62D 35/00
2022/0242208 A1*  8/2022  Klein ...................... B60J 7/062
2023/0069045 A1*  3/2023  Rose .................... B62D 35/007

* cited by examiner

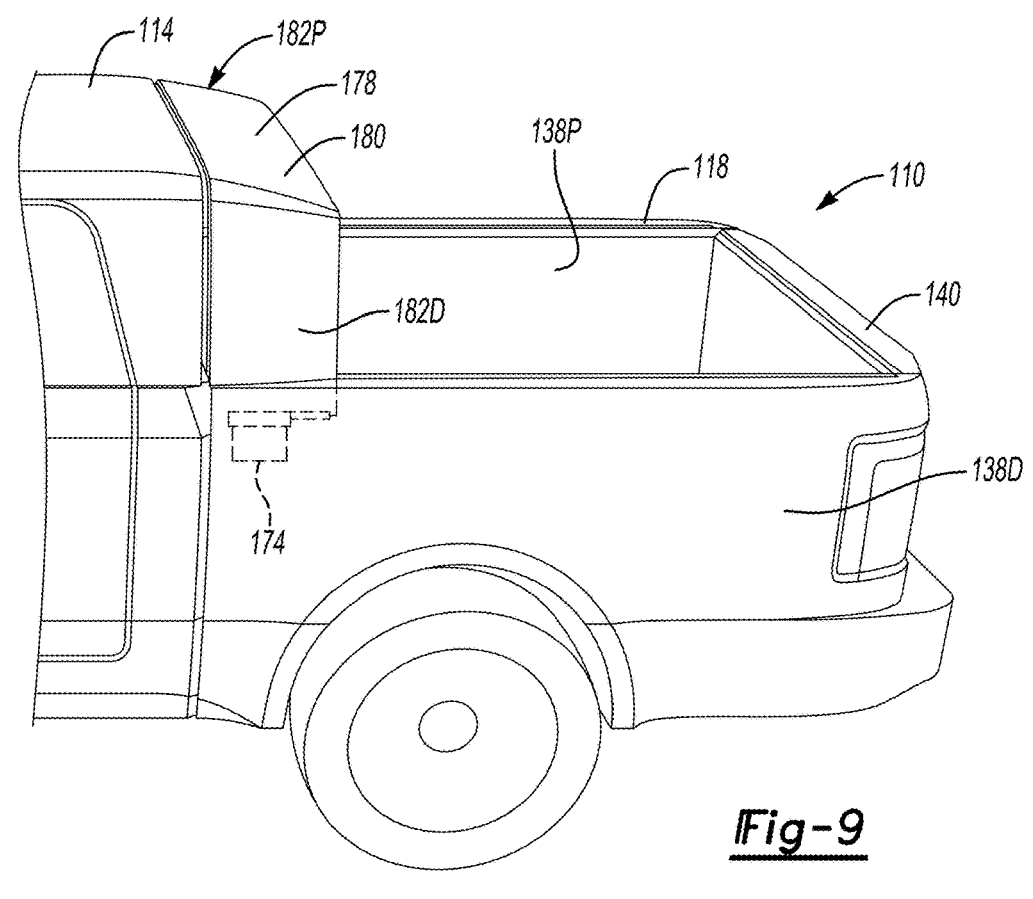
_Fig-9_
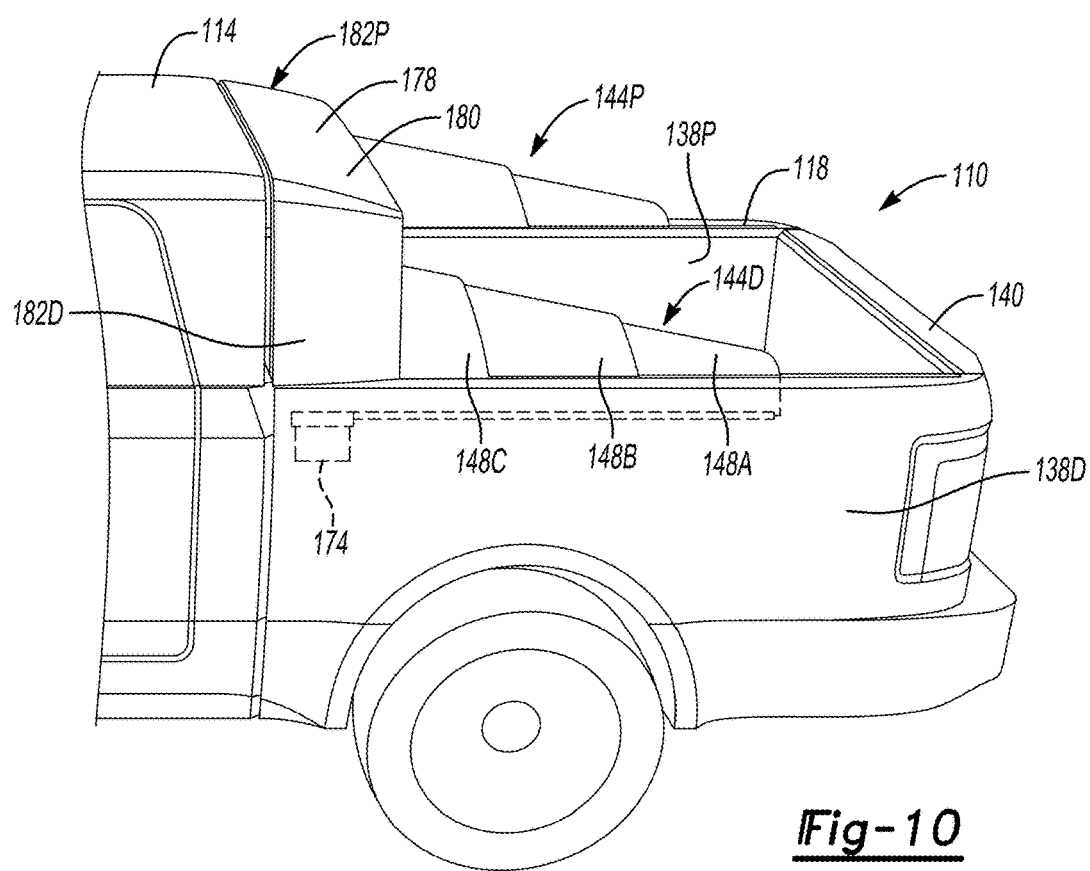
_Fig-10_

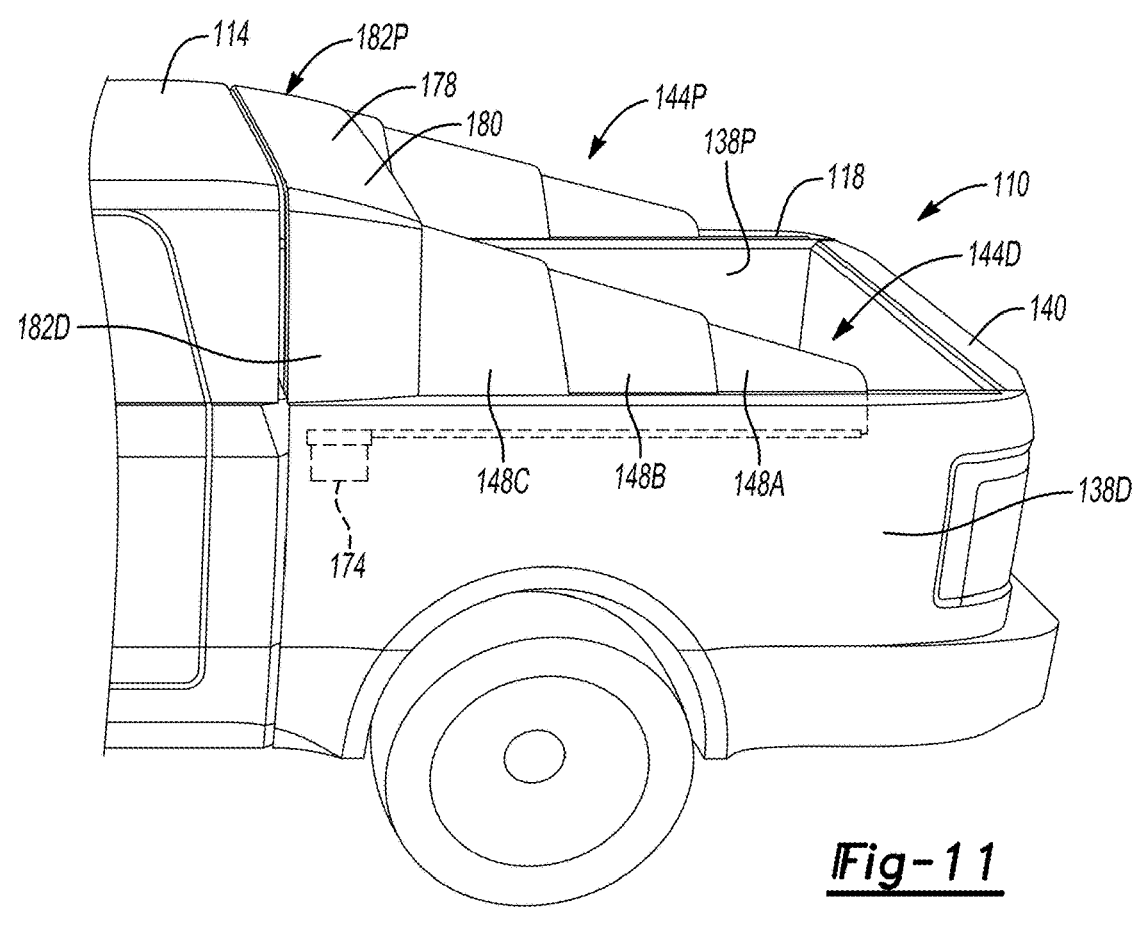
_Fig-11_
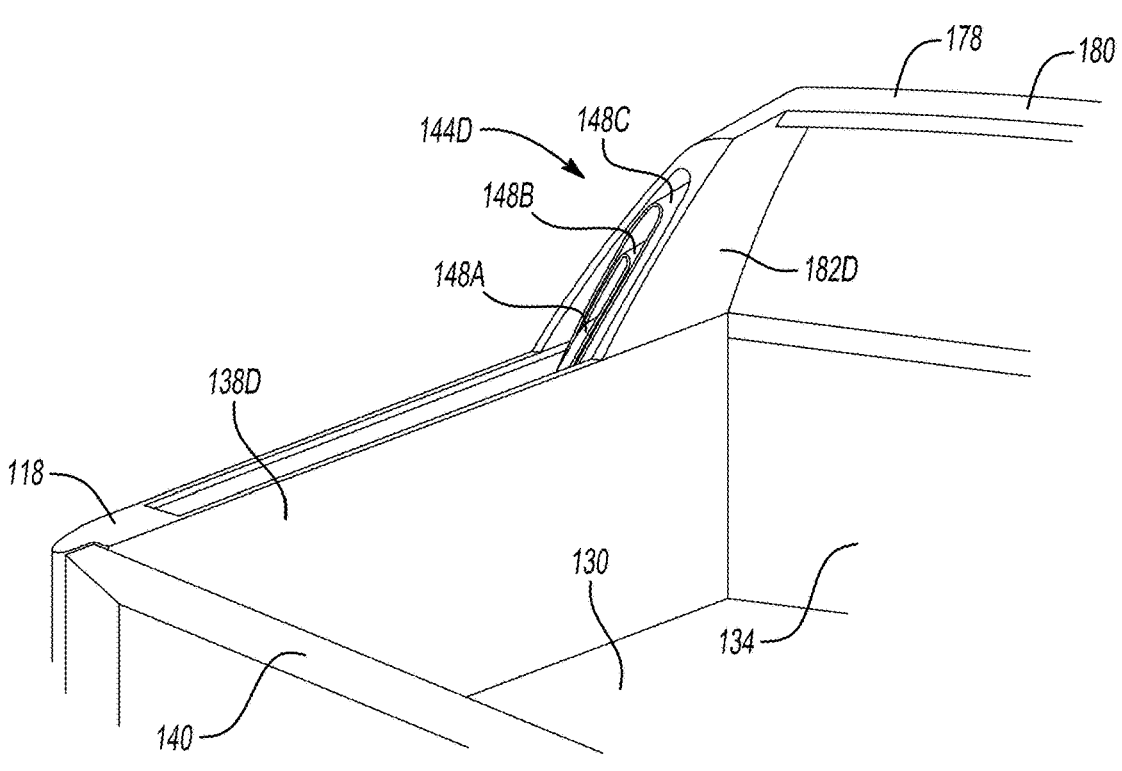
_Fig-12_

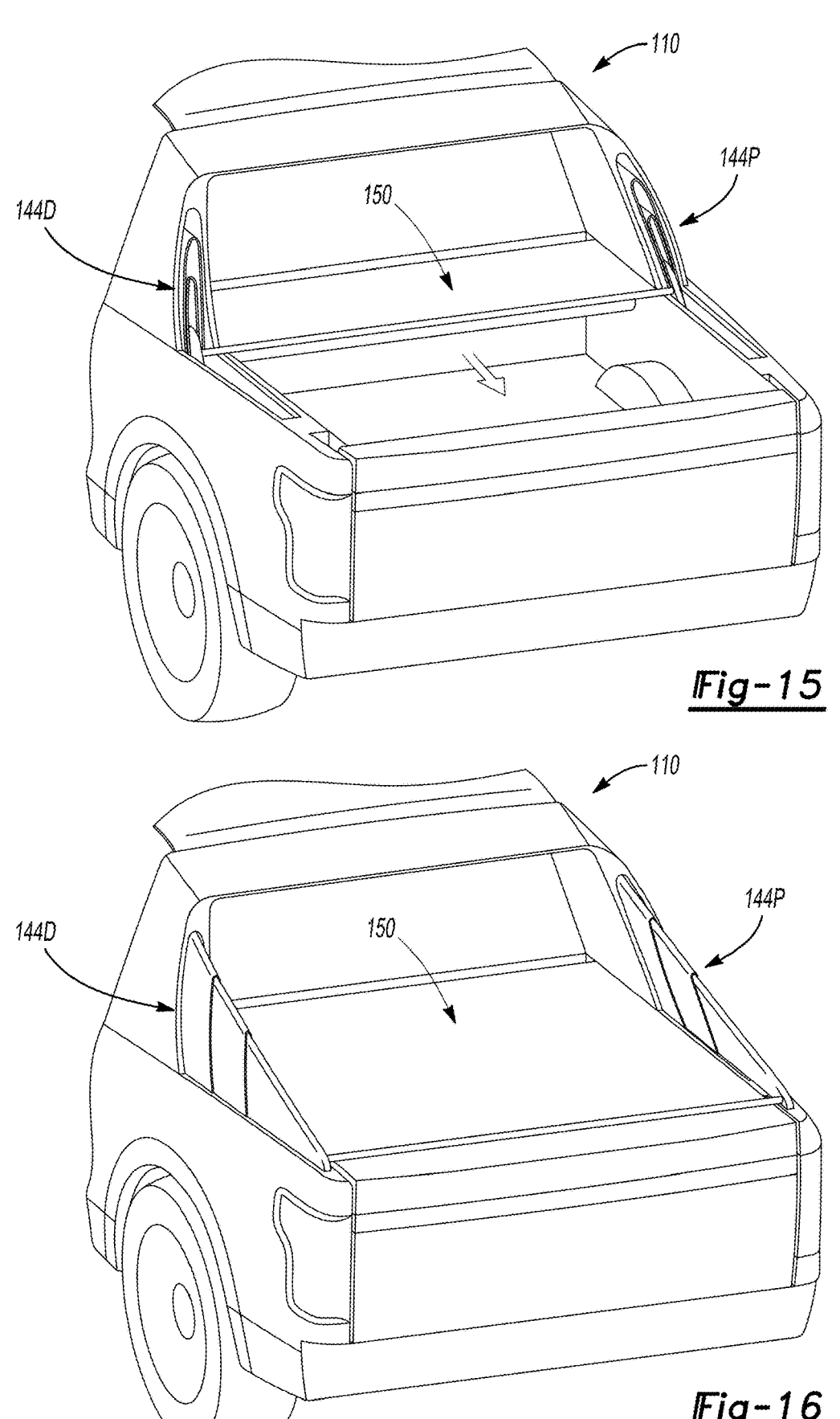
_Fig-15_
_Fig-16_

VEHICLE AERODYNAMIC ALTERING SYSTEM AND METHOD

CROSS-REFERENCE TO RELATED APPLICATIONS

This application claims priority to U.S. Provisional Application No. 63/392,544, which was filed on 27 Jul. 2022 and is incorporated herein by reference in its entirety.

TECHNICAL FIELD

This disclosure relates generally to systems that alter aerodynamics of a vehicle particularly aerodynamics associated with a cargo bed of the vehicle.

BACKGROUND

Some vehicles, such as pickup trucks, include a cargo bed. Users utilize cargo beds to carry various types of cargo. The cargo bed can be located aft of a passenger compartment of the vehicle. The cargo bed can alter flow as the vehicle is driven.

SUMMARY

In some aspects, the techniques described herein relate to a vehicle system, including: a plurality of fins engaged with a bed wall of a cargo bed, the plurality of fins configured to move telescopically back-and-forth between a stowed position and a deployed position.

In some aspects, the techniques described herein relate to a vehicle system, wherein the plurality of fins are disposed along a vertical top of the bed wall.

In some aspects, the techniques described herein relate to a vehicle system, wherein a drag coefficient of a vehicle having the plurality of fins is lower when the plurality of fins are in the deployed position than when the plurality of fins are in the stowed position.

In some aspects, the techniques described herein relate to a vehicle system, wherein the plurality of fins are nested when the plurality of fins are in the stowed position.

In some aspects, the techniques described herein relate to a vehicle system, wherein the plurality of fins includes at least a first fin, a second fin, and a third fin, wherein, when the plurality of fins are in the stowed position, the first fin is held within an aperture of the second fin, and the first and second fins are held within an aperture of the third fin.

In some aspects, the techniques described herein relate to a vehicle system, wherein the plurality of fins are a plurality of driver side fins, and the bed wall is a driver side cargo bed wall, and further including a plurality of passenger side fins engaged with a passenger side cargo bed wall, the plurality of passenger side fins configured to move telescopically back-and-forth between a stowed position and a deployed position.

In some aspects, the techniques described herein relate to a vehicle system, further including a diffuser interfacing directly with a passenger compartment of a vehicle, the diffuser including a horizontally extending portion, a vertically extending portion on a driver side, and a vertically extending portion on a passenger side, the plurality of driver side fins at least partially received within the vertically extending portion on the driver side when the plurality of driver side fins are in the stowed position, the plurality of passenger side fins at least partially received within the vertically extending portion on the passenger side when the plurality of passenger side fins are in the stowed position.

In some aspects, the techniques described herein relate to a vehicle system, further including a tonneau cover that moves with the plurality of passenger side fins and the plurality of driver side fins.

In some aspects, the techniques described herein relate to a vehicle system, wherein the tonneau cover is a rollable tonneau cover that unrolls when the plurality of passenger side fins and the plurality of driver side fins are moved to the deployed position, and that rolls when the plurality of passenger side fins and the plurality of driver side fins are moved to the stowed position.

In some aspects, the techniques described herein relate to a vehicle system, wherein the vertically extending portion on the driver side and the vertically extending portion on the passenger side extending upward from respective cargo bed walls to the horizontally extending portion.

In some aspects, the techniques described herein relate to a vehicle system, wherein an aftmost fin within the plurality of fins pulls the other fins within the plurality of fins when the plurality of fins are transitioned from the stowed position to the deployed position.

In some aspects, the techniques described herein relate to a vehicle system, wherein the plurality of fins provide a wedge-shaped buttress when the plurality of fins are in the deployed position.

In some aspects, the techniques described herein relate to a vehicle system, wherein the plurality of fins extend to an aft end of the cargo bed when the plurality of fins are in the deployed position.

In some aspects, the techniques described herein relate to an aerodynamic adjustment method, including: transitioning a plurality of fins from a stowed position to a deployed position; and providing a buttress with the plurality of fins in the deployed position to reduce a drag coefficient of a vehicle.

In some aspects, the techniques described herein relate to an aerodynamic adjustment method, wherein the plurality of fins are slidably engaged with a cargo bed wall of the vehicle.

In some aspects, the techniques described herein relate to an aerodynamic adjustment method, wherein the transitioning includes an automatic transitioning made in response to an operational condition of the vehicle.

In some aspects, the techniques described herein relate to an aerodynamic adjustment method, wherein the operational condition is a speed of the vehicle.

In some aspects, the techniques described herein relate to an aerodynamic adjustment method, wherein the plurality of fins are stowed within a diffuser when the plurality of fins are in the stowed position.

In some aspects, the techniques described herein relate to an aerodynamic adjustment method, wherein the plurality of fins are a plurality of driver side fins slidable engaged with a driver side cargo bed wall, and further including a plurality of passenger side fins slidably engaged with a passenger side bed wall.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 9 illustrates a vehicle having an aerodynamic altering system according to another exemplary aspect of the present disclosure with the system in a retracted position.

FIG. 10 illustrates the vehicle of FIG. 9 with the system moved from the retracted position toward a deployed position.

FIG. 11 illustrates the vehicle of FIG. 9 with the system moved to the deployed position.

FIG. 12 illustrates a close-up, perspective view of a driver side area of the vehicle of FIG. 9 where the system is in a retracted position.

FIG. 15 illustrates the vehicle of FIG. 9 with the system in the retracted position and the system being used with a rollable tonneau cover.

FIG. 16 illustrates the vehicle of FIG. 9 with the system in the deployed position and the system being used with the rollable tonneau cover.

DETAILED DESCRIPTION

This disclosure details vehicle systems that can be deployed to alter aerodynamics of a vehicle and particularly aerodynamics associated with a cargo bed area of a vehicle. The systems can be deployed to reduce an aerodynamic drag on the vehicle.

Figure 1:
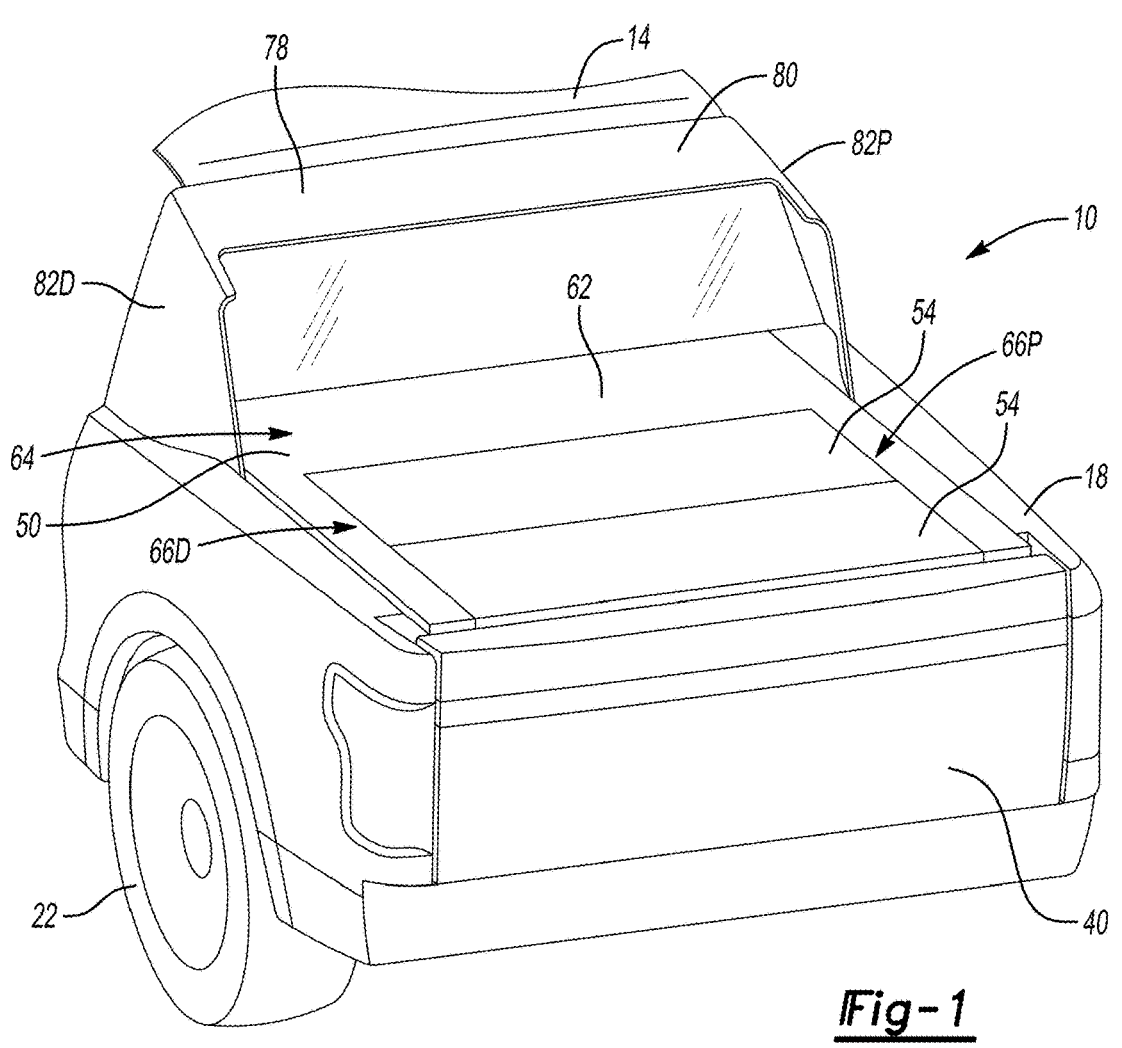
FIG. 1 illustrates a vehicle having an aerodynamic altering system according to an exemplary aspect of the present disclosure with the system comprising a tonneau cover shown in a lowered position.

With reference to FIG. 1, a vehicle 10 includes a passenger compartment 14 and a cargo bed 18 that is aft the passenger compartment 14 along a longitudinal axis of the vehicle 10.

In the exemplary embodiment, the vehicle 10 is a pickup truck. The vehicle 10 could be another type of vehicle in another example, such as a car, van, SUV, etc. The exemplary vehicle 10 has a unibody structure. In other embodiments, the vehicle 10 could have a body-on-frame architecture.

The vehicle 10 is an electrified vehicle. In particular, the vehicle 10 is a battery electric vehicle (BEV). In another example, the vehicle could be another type of electrified vehicle, such as a plug-in hybrid electric vehicle (PHEV), or a conventional vehicle that is exclusive powered by an internal combustion engine.

The exemplary vehicle 10 includes an electrified powertrain capable of applying torque from an electric machine 20 (e.g., an electric motor) to drive one or more drive wheels 22. A traction battery pack 24 of the vehicle 10 powers the electric machine, and potentially, other electrical loads of the vehicle 10. In some examples, the powertrain of the vehicle 10 can electrically propel the drive wheels 22 either with or without the assistance of an internal combustion engine.

As can be appreciated, aerodynamics of the vehicle 10 can affect the operational efficiency of the vehicle 10. Reducing aerodynamic drag can decrease required power from the traction battery pack 24.

Generally, the cargo bed 18 is provided by a floor 30, a front wall 34, a driver side cargo bed wall 38D, a passenger side cargo bed wall 38P, and a tailgate 40. The cargo bed 18 can contribute to aerodynamic drag. The exemplary vehicle 10 incorporates an aerodynamic altering system that can move to influence aerodynamic drag in the area of the cargo bed 18

A tonneau cover 50 covers the cargo bed 18. The tonneau cover 50 can include an acrylonitrile butadiene styrene (ABS) material wrapped about an aluminum core.

Figure 3:
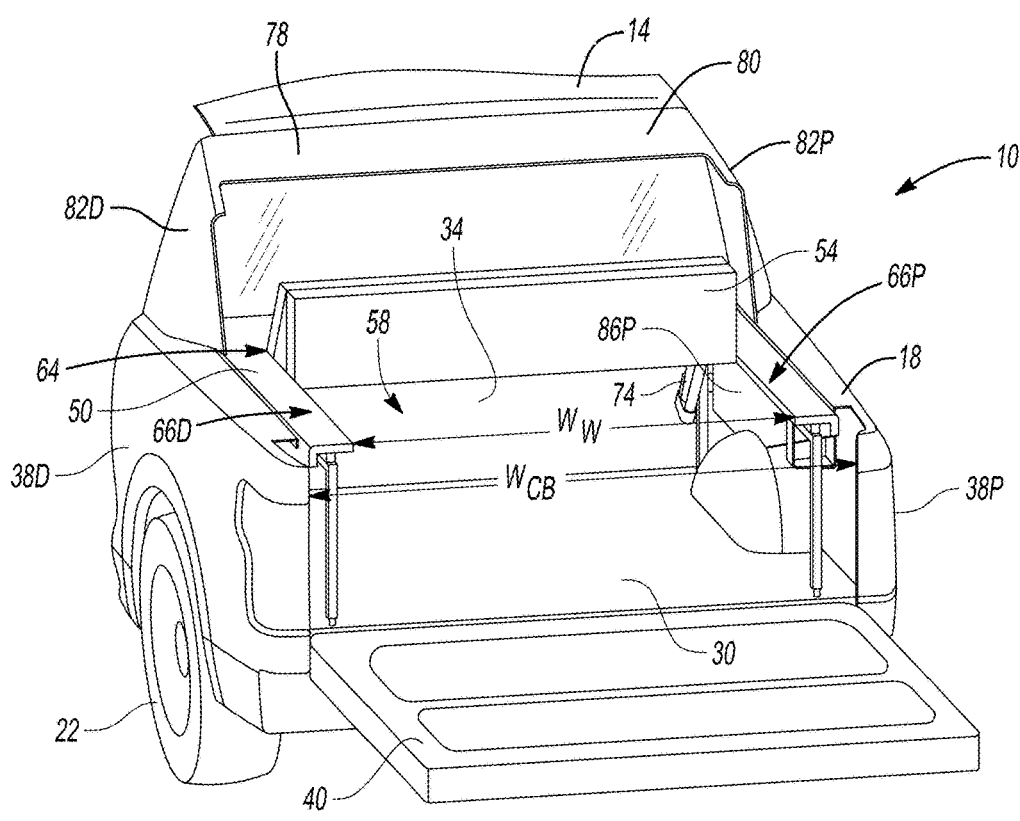
FIG. 3 illustrates the vehicle of FIG. 1 with at least one access panel of the tonneau cover moved to an open position and a tailgate of the vehicle in an open position.

The example tonneau cover 50 includes at least one access panel 54. In FIG. 1, the at least one access panel 54 is shown in a closed position. The at least one access panel 54 is movable from the closed position of FIG. 1 to the open position of FIG. 3. This opens an access window 58 within the tonneau cover 50. A user can access the cargo bed 18 through the access window 58. The access window 58 can also provide clearance necessary to carry taller cargo within the cargo bed 18. The tailgate 40 can be rotated to the open position shown in FIG. 3 to provide additional access to the cargo bed 18.

The tonneau cover 50 has a top 62 that provides the access window 58. The top 62 includes a forward primary portion 64 that spans across the cargo bed 18 in a cross-vehicle direction. The top 62 additionally includes a driver side leg 66D and a passenger side leg 66P that extend rearward from the forward primary portion 64 to define laterally outboard sides of the access window 58. Forward and rearward, for purposes of this disclosure are with reference to a general orientation of the vehicle 10. Similarly, vertical and horizontal, for purposes of the this disclosure are with general orientation of the vehicle 10 during ordinary operation.

The access panels 54 are, when closed, disposed in a common plane with the forward primary portion 64, the driver side leg 66D, and the passenger side leg 66P. The access panels 54 are disposed between the driver side leg 66D and the passenger side leg 66P. Notably, the example access panels 54 do not extend across an entirety of a cross-vehicle width of the cargo bed 18. The access window 58 thus has a window width $W_W$ that is less than a cross-vehicle width of the cargo bed $W_{CB}$.

An actuator assembly 74 of the aerodynamic altering system transitions the tonneau cover 50 to influence aerodynamic drag. The example actuator assembly 74 can transition the tonneau cover 50 back-and-forth between the lowered position of FIG. 1 and the tilted position of FIG. 4. The tonneau cover 50 can thus be considered an active tonneau cover. Operating the vehicle 10 with the tonneau cover 50 in the tilted position reduces aerodynamic drag when compared to operating the vehicle 10 with the tonneau cover 50 in the lowered position. That is, a drag coefficient of the vehicle 10 is lower when the tonneau cover 50 is in the tilted position than when the tonneau cover 50 is in the lowered position.

When in the tilted position the tonneau cover 50 interfaces with a diffuser 78 that extends aftward from the passenger compartment 14 of the vehicle 10. The diffuser 78 includes a horizontally extending portion 80, and opposing vertically extending portions 82D and 82P extending downward from the respective driver side and passenger side of the horizontally extending portion 80. The vertically extending portions 82D and 82P extend upward from respective cargo bed walls 38D and 38P to the horizontally extending portion 80. The diffuser 78 can help to manage flow moving over the passenger compartment 14 to the tonneau cover 50.

In the tilted position, the top 62 of the tonneau cover 50 tapers vertically downward when moving rearward from a forward edge of the tonneau cover 50, and a leading edge of the tonneau cover 50 is vertically elevated relative to a trailing edge of the tonneau cover 50. Further, in the tilted position, a driver side tonneau wall 86D and a passenger side tonneau wall 86P of the tonneau cover 50 are exposed. The driver side tonneau wall 86D and the passenger side tonneau wall 86P are wedge-shaped in this example, with apexes of the wedges a rear area of the tonneau cover 50.

The driver side tonneau wall 86D and the passenger side tonneau wall 86P extend downward from opposite outboard edges of the top 62 of tonneau cover 50. When the tonneau cover 50 is in the lowered position of FIGS. 1 and 3, the driver side tonneau wall 86D and the passenger side tonneau wall 86P are inboard the driver side cargo bed wall 38D and the passenger side cargo bed wall 38P. In other examples, the driver side tonneau wall 86D and the passenger side tonneau wall 86P could fit within slots of the driver side cargo bed wall 38D and the passenger side cargo bed wall 38P when the tonneau cover 50 is in the lowered position.

The diffuser 78 overlaps forward portions of the tonneau cover 50 when the tonneau cover 50 is in the tilted position. The interfaces between the tonneau cover 50 and the diffuser 78 when the tonneau cover 50 is in the tilted position can be sealed interfaces. Seals, for example, could be sandwiched between the vertically extending portions 82D, 82P of the diffuser 78, and the respective driver side tonneau wall 86D or passenger side tonneau wall 86P of the tonneau cover 50. Seals could additionally be disposed between the top 62 of the tonneau cover 50 and the horizontally extending portion 80 of the diffuser 78. Raising the tonneau cover 50 from the lowered position to the tilted position can compress the seals to establish the sealing interfaces.

Figure 4:
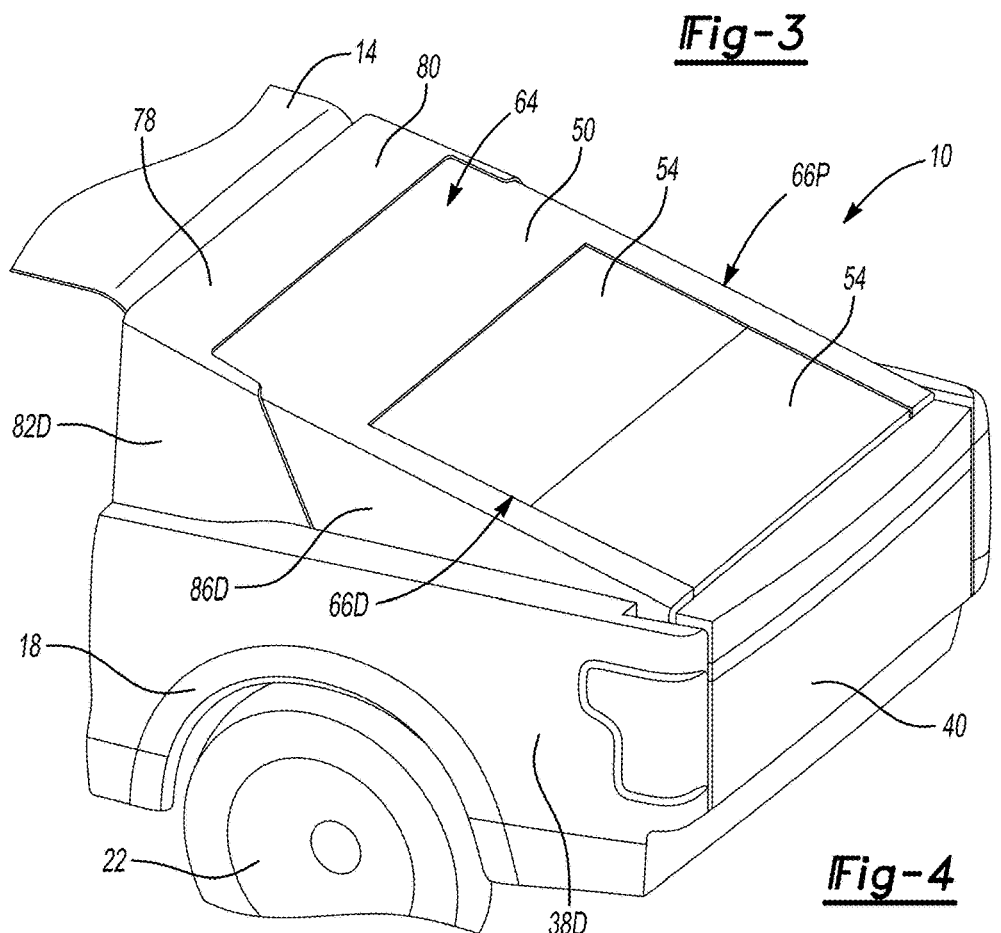
FIG. 4 illustrates the vehicle of FIG. 1 with the tonneau cover of the aerodynamic altering system transitioned to a tilted position.
Figure 5:
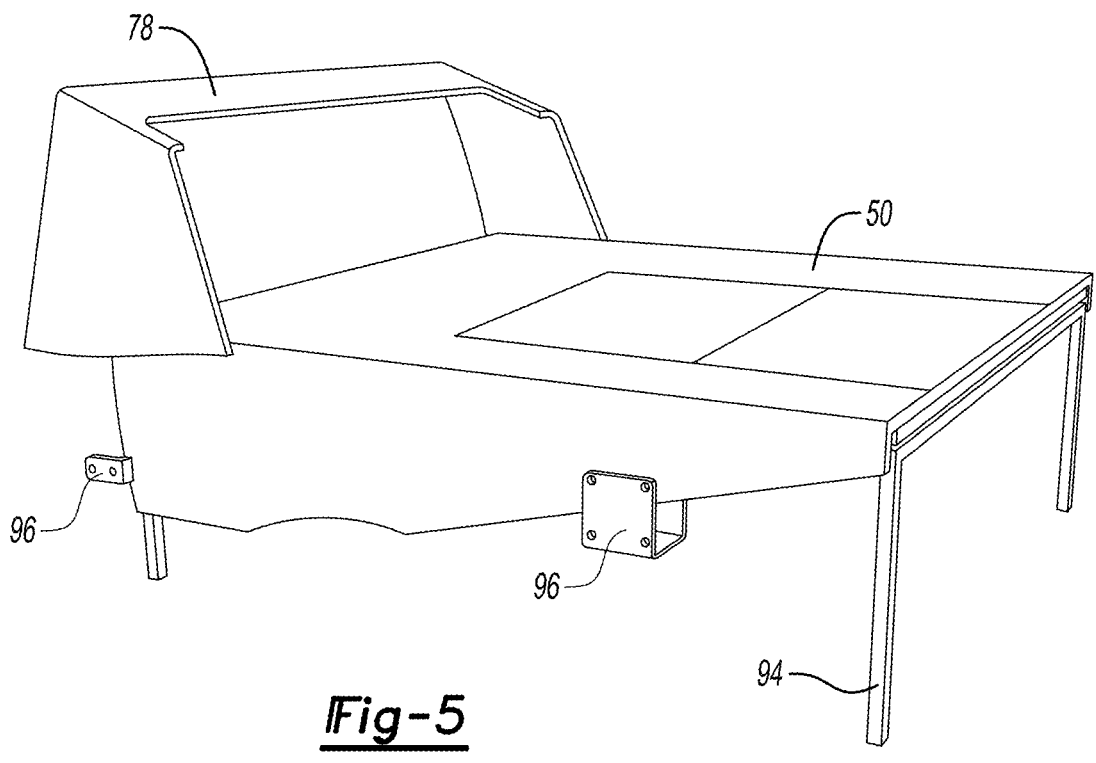
FIG. 5 illustrates a perspective view of the aerodynamic altering system of FIGS. 1-4 with the tonneau cover in the lowered position.
Figure 6:
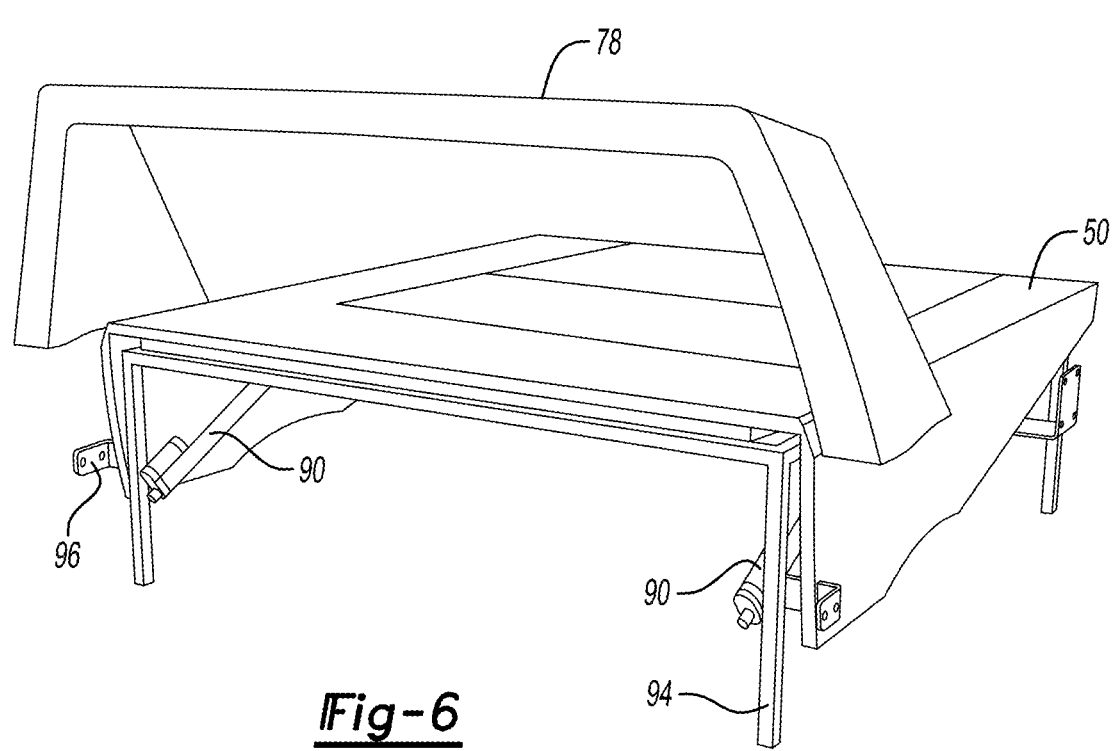
FIG. 6 illustrates another perspective view of the aerodynamic system of FIG. 4.
Figure 7:
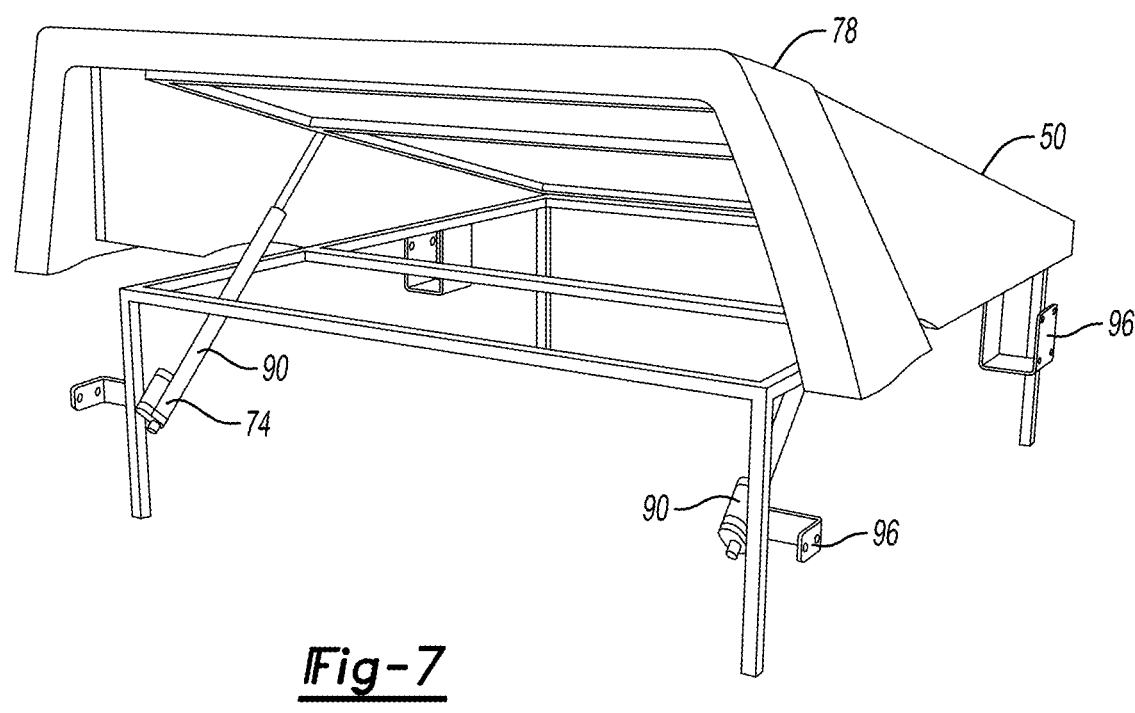
FIG. 7 illustrates a perspective view of the aerodynamic altering system of FIGS. 1-4 with the tonneau cover in the tilted position.
Figure 8:
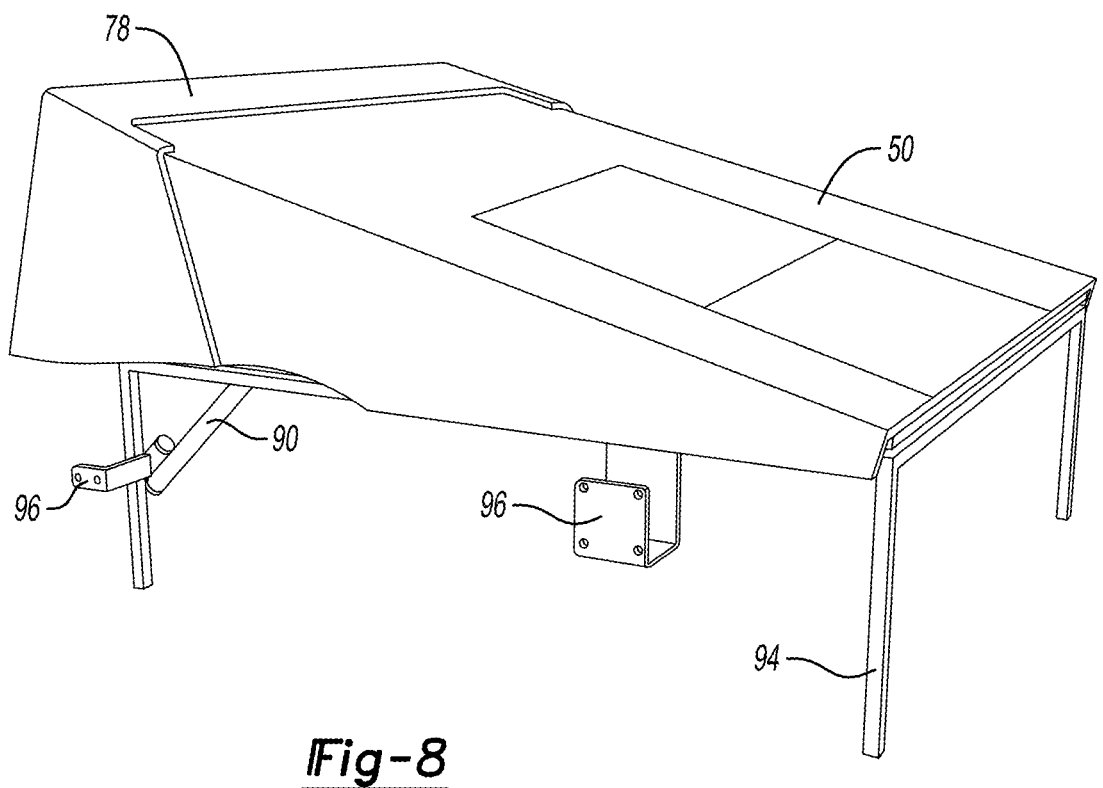
FIG. 8 illustrates another perspective view of aerodynamic altering system of FIG. 7.
Figure 13:
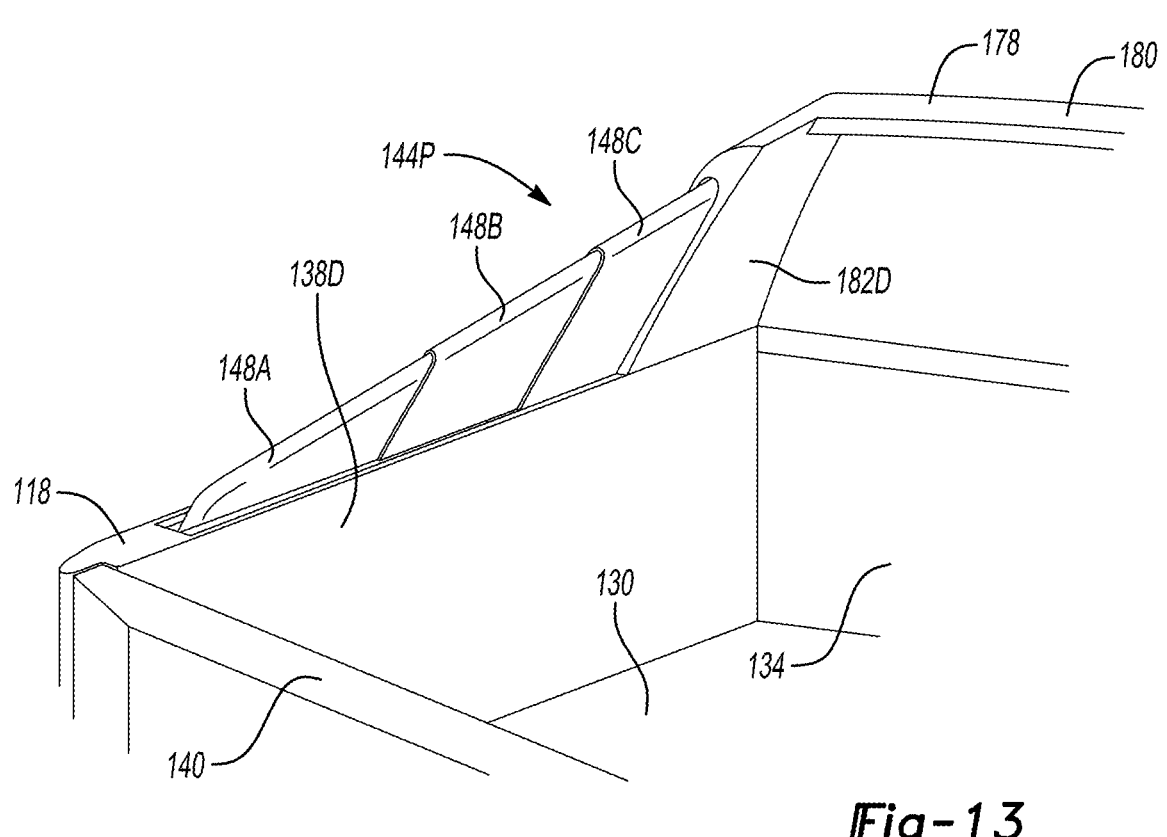
FIG. 13 illustrates a close-up, perspective view of the area shown in FIG. 12 with the system in the deployed position.

With reference now to FIGS. 5-8 and continuing reference to FIGS. 1-4, transitioning the tonneau cover 50 back and forth between the lowered position of FIG. 1 and the tilted position of FIG. 4 can involve a powering of the actuator assembly 74.

The vehicle 10 can include a control module 88 (FIG. 2) that is utilized to control and coordinate the exemplary methods of making aerodynamic adjustments using the aerodynamic altering system. The control module 88 can be part of larger module within the vehicle 10. The control module 88, in this example, includes a processor operatively linked to a memory portion. The example processor can be programmed to execute a program stored in the memory portion. The program may be stored in the memory portion as software code. The program stored in the memory portion may include one or more additional or separate programs, each of which includes an ordered list of executable instructions for implementing logical functions.

The processor can be a custom made or commercially available processor, a central processing unit (CPU), an auxiliary processor among several processors associated with the control module, a semiconductor based microprocessor (in the form of a microchip or chip set) or generally any device for executing software instructions.

The memory portion can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The memory may incorporate electronic, magnetic, optical, and/or other types of storage media.

In this example, the actuator assembly 74 includes, among other things, linear actuators 90 that can extend and retract to respectively raise the tonneau cover 50 to the tilted position and lower the tonneau cover 50 to the lowered position. The linear actuators 90 extend and retract in response to a signal from the control module 88. The linear actuators 90 are supported on a frame structure 94, which can be secured to the bed walls 38D, 38P utilizing a plurality of brackets 96.

The linear actuators 90 can be activated by the control module 88 to automatically transition the tonneau cover 50 in response to particular operational conditions of the vehicle 10. For example, when the vehicle 10 meets or exceeds a threshold speed, say 10 mph, the control module 88 can activate the linear actuators 90 to extend the linear actuators 90 and raise the tonneau cover 50 to the tilted position. When the speed of the vehicle 10 drops back below the threshold speed, the control module 88 can activate the linear actuators 90 to retract the linear actuators 90 and retract the tonneau cover 50 from the tilted position back to the lowered position.

The lowered position can facilitate a user adding and remove cargo from the cargo bed 18. The lowered position may also be considered more aesthetically pleasing than the tilted position when the vehicle 10 is stationary or operating at speeds below the threshold speed. When the vehicle 10 is stationary or moving below the threshold speed, the aerodynamic benefits provided by the tonneau cover 50 may not be required.

With reference now to FIGS. 9-13, another example vehicle 110 includes a passenger compartment 114 and a cargo bed 118 that is aft the passenger compartment 114 along a longitudinal axis of the vehicle 110.

The cargo bed 118 provided by a floor 130, a front wall 134, a driver side cargo bed wall 138D, a passenger side cargo bed wall 138P, and a tailgate 140. The cargo bed 118 can contribute to aerodynamic drag. The exemplary vehicle 110 incorporates an aerodynamic altering system that can move to influence aerodynamic drag in the area of the cargo bed 118

The exemplary aerodynamic altering system of the vehicle 110 includes plurality of fins 144D engaging the driver side cargo bed wall 138D, and a plurality of fins 144P engaging the passenger side cargo bed wall 138P.

The fins 144D and 144P are disposed along a vertical top of the cargo bed wall 138D and the cargo bed wall 138P, respectively. The fins 144D and 144P slidable engage the walls 138D and 138P and are configured to move telescopically back-and-forth between a stowed position and a deployed position. The fins 144D and 144P provide a wedge-shaped buttressed when in the deployed position. The fins 144D and 144P extend to an aft end of the cargo bed 118 when the fins 144D and 144P are in the deployed position.

The fins 144D and 144P in the deployed position redirect airflow around the cargo bed 118. When the fins 144D and 144P are in the deployed position, a drag coefficient of the vehicle 110 is lower than when the plurality of fins 144D and 144P are in the stowed position.

When the example fins 144D and 144P are in the stowed position, the fins 144D and 144P nest within each other. For example, with reference to the fins 144D being in the stowed position, a first fin 148A is held within an aperture of a second fins 148B, and the first fin 148A and 148B are held within an aperture of a third fin 148C.

The fins 144D can move within a track along the vertical top of the cargo bed wall 138D. In some examples, to move the fins 144D, a linear actuator 174 within the cargo bed wall 138D is coupled to the first fin 148A, which is the aftmost fin when the fins 144D are in the deployed position. In this example, only the first fin 148A is directly driven by the linear actuator 174. The linear actuator 174 can extend to move the first fin 148A to the deployed position. The second fin 148B and third fin 148C are connected to the first fin 148A and pulled to the deployed position when the first fin 148A is moved by the linear actuator 174. The linear actuator 174 retracts to draw the first fin 148A to the retracted position. The second fin 148B and third fin 148C are pushed by the first fin 148A back to the retracted position. The fins 144P can be similarly driven by a linear actuator in the cargo bed wall 138P.

Figure 2:
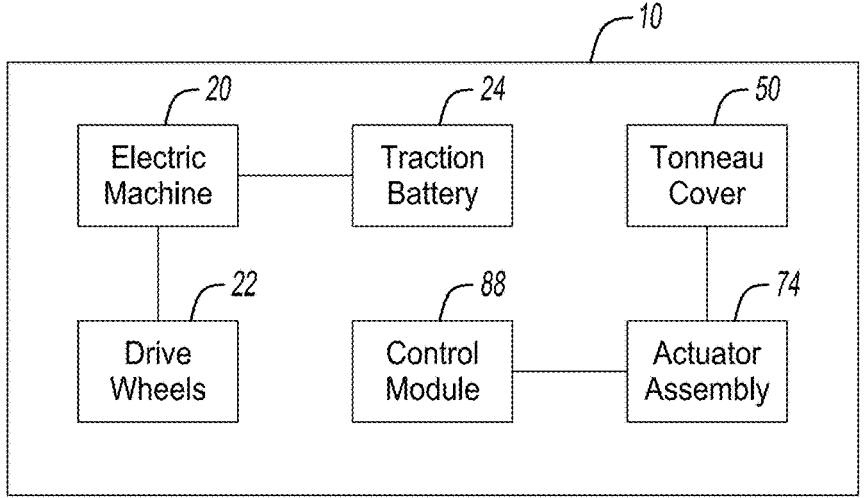
FIG. 2 illustrates a highly schematic view of the vehicle of FIG. 1.

The linear actuator 174 or other actuator used to move the fins 144D can be controlled and activated using a control module, such as the control module 88 described in connection with FIG. 2. The linear actuator 174 can be activated to extend when the vehicle 110 reaches a threshold speed. The linear actuator 174 can be activate to retract when the vehicle 110 drops back below the threshold speed. Thus, the fins 144D are retracted when the vehicle 110 is stationary and the fins 144D do not interfere with a user loading the cargo bed 118 over the driver side cargo bed wall 138D.

Like the vehicle 10 of FIG. 1, the vehicle 110 includes a diffuser 178 extending aftward from the passenger compartment 114 of the vehicle 110. The diffuser 178 includes a horizontally extending portion 180, and opposing vertically extending portions 182D and 182P extending downward from the respective driver side and passenger side of the horizontally extending portion 180. The vertically extending portions 182D and 182P extend upward from respective cargo bed walls 138D and 138P to the horizontally extending portion 180. The diffuser 178 can help to manage flow moving over the passenger compartment 114 to the tonneau cover 150.

When the fins 144D and 144P are in the stowed positions, the fins 144D and 144P are at least partially received within the respective vertically extending portions 182D and 182P.

Figure 14:
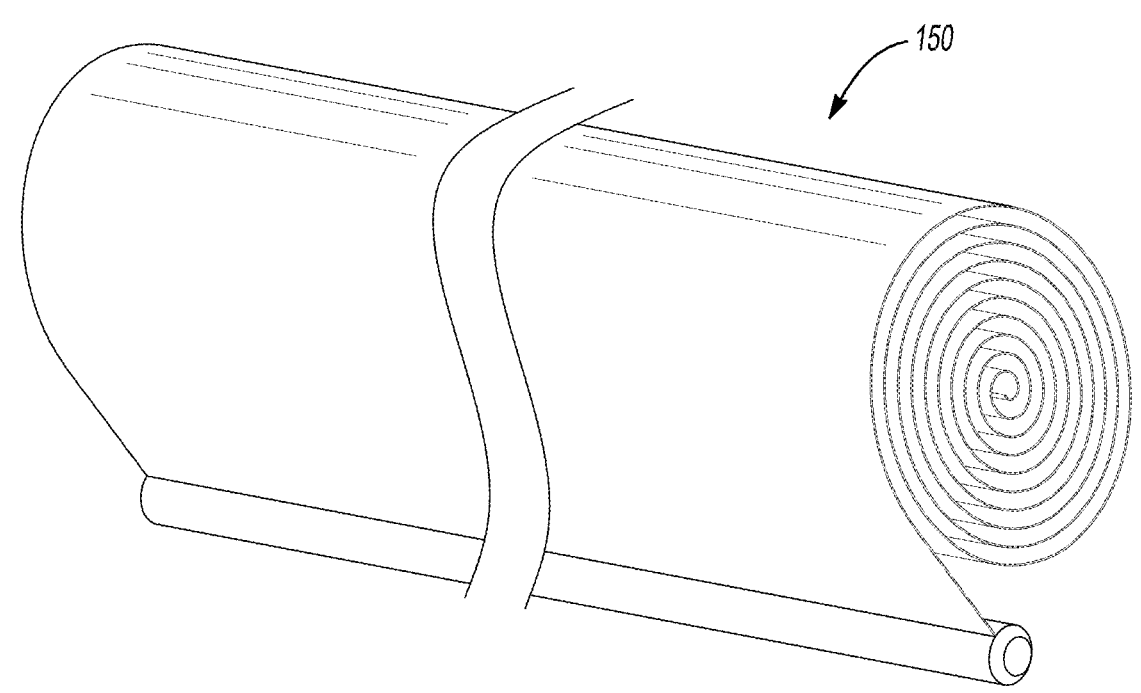
FIG. 14 illustrates a rollable tonneau cover.

With reference to FIGS. 14-16, in some examples, the fins 144D and 144P are attached to a tonneau cover 150, which is rollable in this example. When the fins 144D and 144P are deployed, the fins 144D and 144P pull the tonneau cover 150 to unroll the tonneau cover 150 over the cargo bed 118. The tonneau cover 150 rolls back up when the fins 144D and 144P retract back to the stowed position. The tonneau cover 150 thus moves with the fins 144D and 144P.

The disclosed example aerodynamic systems can be deployable when a vehicle is travelling at certain speeds to provide aerodynamic gains, which can be especially useful for electrified vehicles that rely on traction batteries for propulsion. The systems can then retract when the vehicle is parked so the systems do not interfere with access to a cargo bed of the vehicle.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle system, comprising:
   a plurality of fins engaged with a bed wall of a cargo bed, the plurality of fins configured to move telescopically back-and-forth between a stowed position and a deployed position, the plurality of fins including at least a first fin and a second fin, when the plurality of fins are in the stowed position, the first fin is held within a second fin aperture of the second fin, the second fin defining an inboard side of the second fin aperture at a position between the cargo bed and the second fin aperture.

2. The vehicle system of claim 1, wherein the plurality of fins are disposed along a vertical top of the bed wall, wherein each fin is positioned entirely outboard of the cargo bed such that no portion of the fin spans over the cargo bed.

3. The vehicle system of claim 1, wherein a drag coefficient of a vehicle having the plurality of fins is lower when the plurality of fins are in the deployed position than when the plurality of fins are in the stowed position.

4. The vehicle system of claim 1, wherein the plurality of fins are nested when the plurality of fins are in the stowed position.

5. The vehicle system of claim 1, wherein the plurality of fins further includes a third fin, wherein, when the plurality of fins are in the stowed position, the first and second fins are held within a third fin aperture of the third fin, the third fin defining an inboard side of the third fin aperture at a position between the cargo bed and the third fin aperture.

6. The vehicle system of claim 1, wherein the plurality of fins are a plurality of driver side fins, and the bed wall is a driver side cargo bed wall, and further comprising a plurality of passenger side fins engaged with a passenger side cargo bed wall, the plurality of passenger side fins configured to move telescopically back-and-forth between a stowed position and a deployed position.

7. The vehicle system of claim 6, further comprising a diffuser interfacing directly with a passenger compartment of a vehicle, the diffuser including a horizontally extending portion, a vertically extending portion on a driver side, and a vertically extending portion on a passenger side, the plurality of driver side fins at least partially received within the vertically extending portion on the driver side when the plurality of driver side fins are in the stowed position, the plurality of passenger side fins at least partially received within the vertically extending portion on the passenger side when the plurality of passenger side fins are in the stowed position.

8. The vehicle system of claim 7, further comprising a tonneau cover that moves with the plurality of passenger side fins and the plurality of driver side fins.

9. A vehicle system, comprising:
   a plurality of fins engaged with a bed wall of a cargo bed, the plurality of fins configured to move telescopically back-and-forth between a stowed position and a deployed position, the plurality of fins are a plurality of driver side fins, and the bed wall is a driver side cargo bed wall, and further comprising a plurality of passenger side fins engaged with a passenger side cargo bed wall, the plurality of passenger side fins configured to move telescopically back-and-forth between a stowed position and a deployed position; a diffuser interfacing directly with a passenger compartment of a vehicle, the diffuser including a horizontally extending portion, a vertically extending portion on a driver side, and a vertically extending portion on a passenger side, the plurality of driver side fins at least partially received within the vertically extending portion on the driver side when the plurality of driver side fins are in the stowed position, the plurality of passenger side fins at least partially received within the vertically extending portion on the passenger side when the plurality of passenger side fins are in the stowed position; and a tonneau cover that moves with the plurality of passenger side fins and the plurality of driver side fins, the tonneau cover is a rollable tonneau cover that unrolls when the plurality of passenger side fins and the plurality of driver side fins are moved to the deployed position, and that rolls when the plurality of passenger side fins and the plurality of driver side fins are moved to the stowed position.

10. The vehicle system of claim 7, wherein the vertically extending portion on the driver side and the vertically extending portion on the passenger side extending extend upward from respective cargo bed walls to the horizontally extending portion.

11. The vehicle system of claim 1, wherein an aftmost fin within the plurality of fins pulls the other fins within the plurality of fins when the plurality of fins are transitioned from the stowed position to the deployed position.

12. The vehicle system of claim 1, wherein the plurality of fins provide a wedge-shaped buttress when the plurality of fins are in the deployed position.

13. The vehicle system of claim 1, wherein the plurality of fins extend to an aft end of the cargo bed when the plurality of fins are in the deployed position.

14. An aerodynamic adjustment method, comprising:

transitioning a plurality of fins from a stowed position to a deployed position, the plurality of fins including an aftmost fin that pulls the other fins within the plurality of fins during the transitioning; and providing a buttress with the plurality of fins in the deployed position to reduce a drag coefficient of a vehicle, wherein the aftmost fin is received within an aperture of another of the fins when the plurality of fins are in the stowed position, the other of the fins defining opposing inboard and outboard sides of the aperture at a position between the cargo bed and the aperture.

15. The aerodynamic adjustment method of claim 14, wherein the plurality of fins are slidably engaged with a cargo bed wall of the vehicle, wherein each fin is positioned entirely outboard of the cargo bed such that no portion of the fin spans over the cargo bed.

16. The aerodynamic adjustment method of claim 14, wherein the transitioning comprises an automatic transitioning made in response to an operational condition of the vehicle.

17. The aerodynamic adjustment method of claim 16, wherein the operational condition is a speed of the vehicle.

18. The aerodynamic adjustment method of claim 14, wherein the plurality of fins are stowed within a diffuser when the plurality of fins are in the stowed position.

19. The aerodynamic adjustment method of claim 14, wherein the plurality of fins are a plurality of driver side fins slidably engaged with a driver side cargo bed wall, and further comprising a plurality of passenger side fins slidably engaged with a passenger side bed wall.

\* \* \* \* \*